Patented Sept. 24, 1935

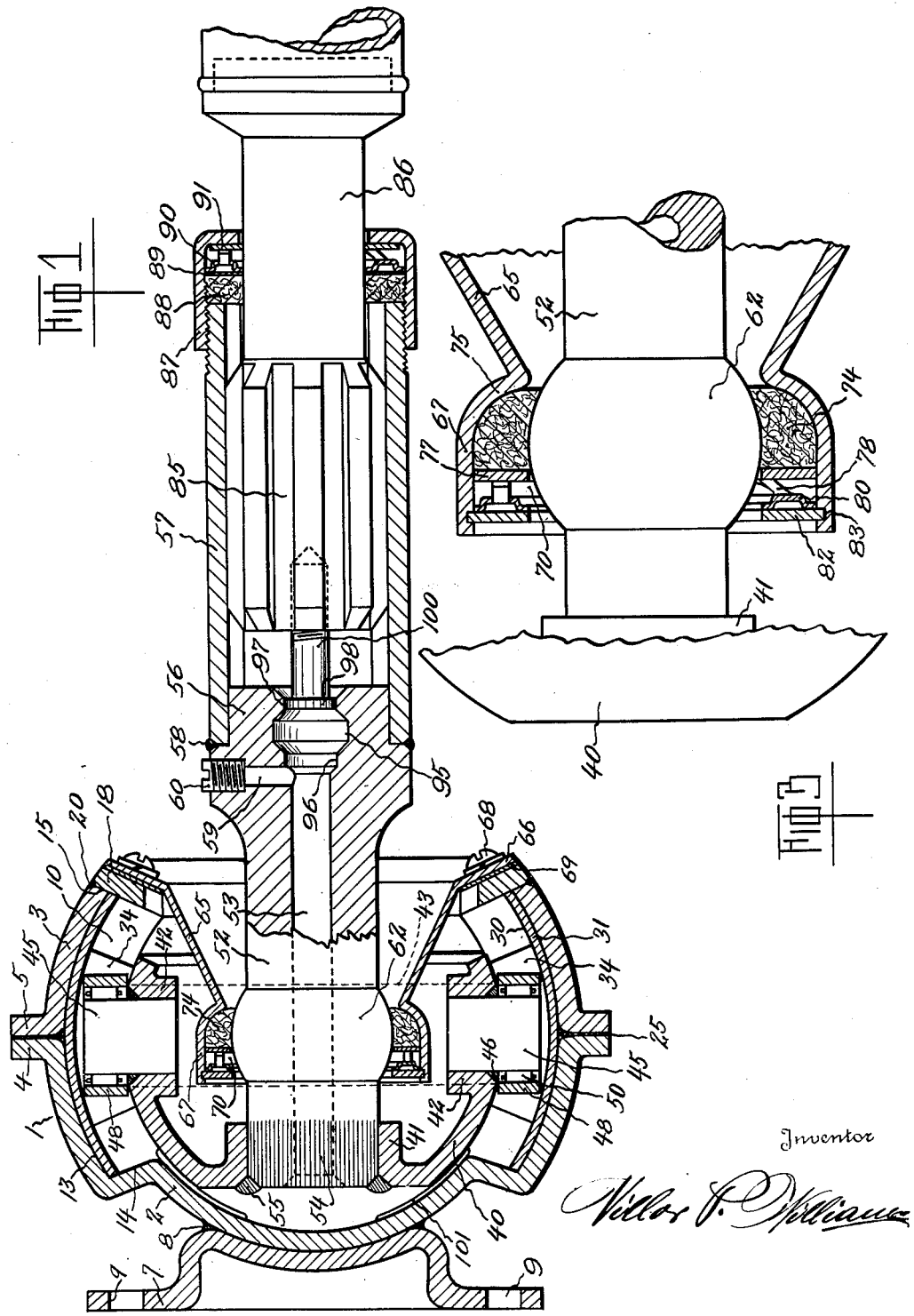

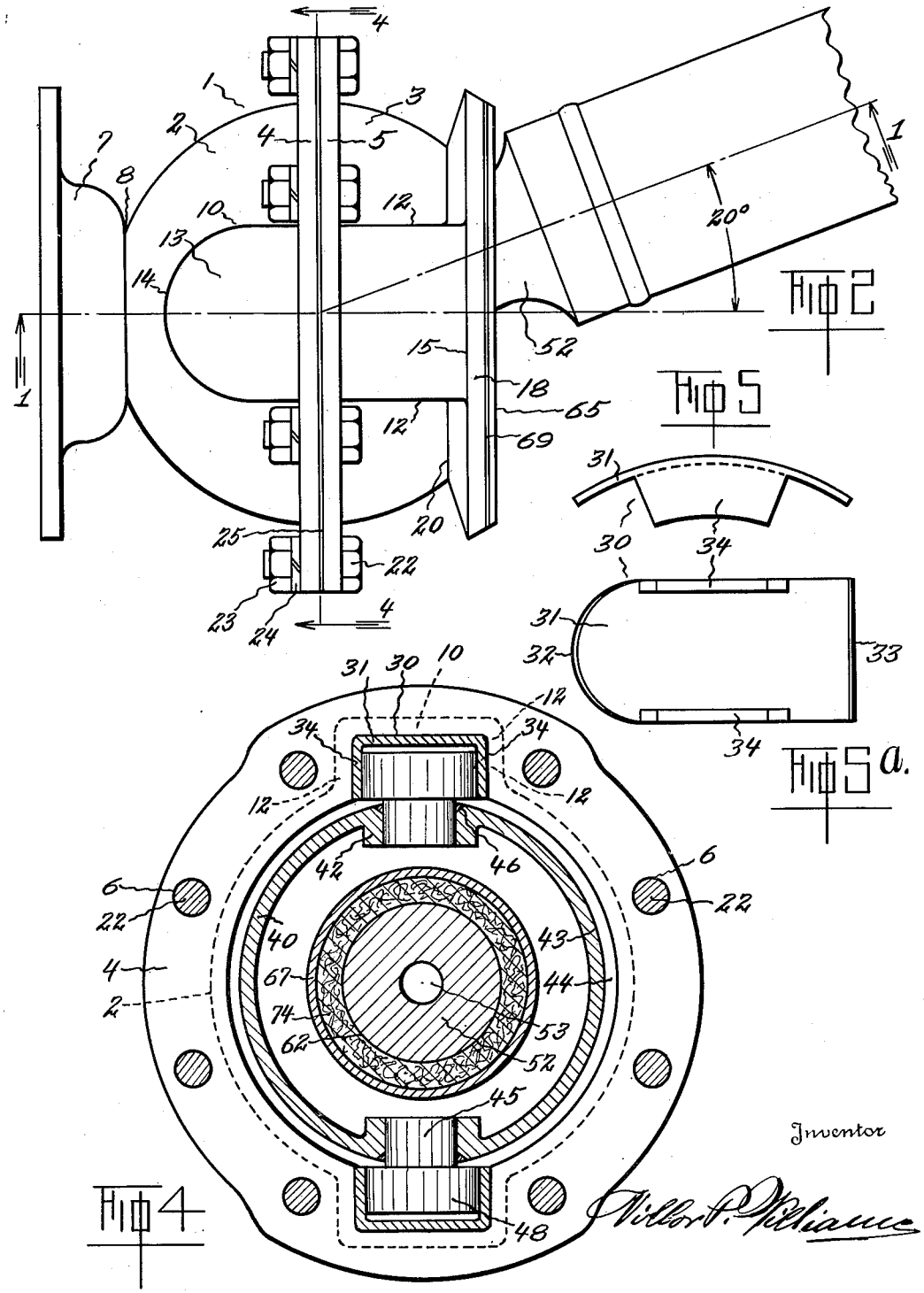

2,015,390

UNITED STATES PATENT OFFICE 2,015,390

UNIVERSAL JOINT

Villor P. Williams, Baltimore, Md., assignor to Estelle P. Williams, Baltimore, Md.

Application April 5, 1934, Serial No. 719,211

23 Claims. (Cl. 64—91)

This invention relates to a ball and socket universal joint of the type set forth in my Patent No. 1,940,779, granted December 26, 1933.

The essential object of this invention is to provide a ball and socket construction wherein grinding of the ball element is dispensed with. As is well known the grinding of the ball element constituted an exceedingly difficult operation requiring a great amount of time and involving obviously a necessary high degree of accuracy, thus increasing the cost of the joint considerably. It is accordingly an object of this invention to provide a ball member so shaped in the form of a segment of a sphere as to be readily adapted to be formed as a forging or stamping, and utilizing a minimum amount of metal.

Another object of this invention involves the attachment of a ball stem to the innermost side of the ball and mounting the joint packing on the stem at the center of the ball, thus permitting an increase in the operating angle of the universal joint and obviating the necessity for the accurate grinding of a spherical surface on the ball.

A still further object of this invention is the provision of a lubricating system that functions to positively lubricate the cooperating parts of the universal joint by virtue of a pumping action set up in the joint itself and also in the provision of automatic means for permitting the flow of lubricant to the splined connection of the ball stem with the drive or propeller shaft of a motor vehicle.

Other objects of this invention relate to the simplification in construction and increased efficiency in the type of universal joint described in my patent above referred to as exemplified in the universal joint disclosed in the following specification, as well as a reduction in the cost of manufacture thereof.

In the drawings wherein is illustrated the preferred form of my invention:—

Fig. 1 is a vertical section through the universal joint assembly taken on line 1—1 of Fig. 2.

Fig. 2 is a top plan view of the universal joint assembly.

Fig. 3 is an enlarged detail view of the packing construction.

Fig. 4 is a sectional view through the universal joint housing taken on line 4—4 of Fig. 2.

Fig. 5 shows in side elevation and Fig. 5a in bottom plan view of one of the trunnion bearing shoes.

In the drawings wherein like characters of reference are used to designate like or similar parts throughout the several views:—

The universal joint housing is generally designated by 1, said housing comprising a rear housing portion 2 and a front housing portion 3. These housing portions 2 and 3 are preferably formed as stampings each provided with a radial flange 4, 5 having aligned openings 6 for the reception of fastening bolts. As will be noted the inner surfaces of the housing portions 2 and 3 are spherical. The rear housing portion 2 has secured exteriorly to its closed end an attaching flange 7 which may also be a stamping. The same being rigidly secured thereto by welding as at 8, said attaching flange being provided with bolt openings 9.

Each of the housing portions 2 and 3 are formed with oppositely disposed channel portions of inverted U-form adapted to register with each other to form the channels 10, said channels extending outwardly of the interior spherical surface of the housing 1 and being in the same plane. The side walls 12 of the channels 10 are parallel to each other, the bottom walls 13 being on arcs of equal radii. Referring to Fig. 2 it will be seen that the end walls 14 of the channels 10 constituting an integral part of the rear housing portion 2 are curved, while the other end of the channels 10 in the front housing portion 3 are open, the edge of the bottom wall 13 at the open end being straight as at 15.

Closing the open ends of the channels 10 and forming an end wall for the front housing portion 3 is an annular cone shaped retaining ring 18 welded at its periphery as at 20 to the front housing portion 3.

The housing portions 2 and 3 are securely fastened together by the bolts 22, nuts 23 and lock washers 24, there being provided between the flanges 4 and 5 a suitable gasket 25, rendering the joint fluid tight.

Disposed within the channels 10 of the housing 1 are bearing shoes 30 shown in detail in Fig. 5 and Fig. 5a. The bearing shoes 30 are each U-shaped and are provided with a bottom wall 31 having a curvature substantially equal to the channel bottom wall 13, one end of the shoe 30 being curved as at 32 and the other end being straight as at 33 whereby the same will snugly seat on the bottom wall 13 of the channel 10. The side walls 34 of the bearing shoe 30 are straight and parallel to each other, said walls being positioned intermediate the ends of the bottom wall 31, and of a length slightly in excess of the arc of movement of the trunnion members as will be hereinafter described, said walls 34 being in engagement with the side walls 12 of the channels 10, the bearing shoes 30 being thus immovably held in said channels. The bearing shoes 30 are preferably made of a wear resisting metal as the walls 34 thereof serve as roller bearing surfaces, as well as thrust receiving surfaces as a result of the torque transmission.

Positioned within the universal housing 1 is the ball member 40 of the universal joint. This ball member 40 is preferably made as a stamping and is essentially in the form of a segment of a sphere as clearly shown in Fig. 1, having a large diameter end and a small diameter end. Integral with the small diameter end is an inwardly directed axially disposed boss 41. In a plane at right angles to the axis of the boss 41 and oppositely disposed with respect to each other are the trunnion bosses 42 having the same axis which coincides with a diameter of the ball 40. The exterior of the ball 40 in the plane of the bosses 42 is provided with an annular flat portion 43 indicated by the dotted lines and defining with the surface of the housing 1 an annular reservoir 44 for lubricant as specifically set forth in my patent above identified. Extending outwardly of the bosses 42 are the trunnions 45 which are rigidly secured therein as by the weld 46, said trunnions being thus movable with the ball 40.

Rotatably mounted on the projecting end of each trunnion 45 is a roller 48, there being interposed between the trunnions 45 and rollers 48, anti-friction roller or needle bearings 50. The external diameter of the rollers 48 is such that the same will at all times have roller bearing engagement with each of the walls 34 of the bearing shoes 30. As pointed out above, the length of the bearing walls 34 is slightly greater than the maximum arc of movement of the rollers 48.

Movement of the ball 40 within the housing 1 is controlled by the ball stem 52 which is substantially a cylindrical rod or shank provided with a longitudinal passage 53. One end of the ball stem 52 is serrated as at 54 and inserted in the boss 41 in non-rotatable engagement therewith. To insure the rigid connection of the ball stem 52 with the ball 40 the same is additionally welded thereto as at 55, it being understood that other means may be utilized for rigidly fastening the ball stem to the ball if so desired. As will be apparent the ball stem 52 projects axially outwardly, see Fig. 1, of the interior of the ball 40, and is formed at the outer end thereof with an enlarged portion 56 to which is rigidly secured an internally splined hub 57 as by the weld 58. Communicating with the passage 53 is a transverse passage 59 adjacent the end of the ball stem, said passage being normally closed by the filler plug 60 and through which passage lubricant may be placed into the universal joint.

Formed on the ball stem 52 intermediate the ends thereof is an enlarged portion 62 formed in the shape of a segment of a sphere, the center of curvature thereof coinciding with the center of the ball and housing members, as most clearly shown in Fig. 1, it being apparent therein that the spherical portion 62 of the ball stem disposed at the center of the ball 40 will thus at all times be in the center of the spherical housing 1, irrespective of the angular relationship of the ball stem 52 relative to the axis of the housing 1. To insure proper functioning of the spherical portion 62 on the ball stem 52 with its cooperating parts to be hereinafter described, it is necessary that said spherical portion be accurately ground within very close tolerances.

To close the open end of the housing 1 and to seal the lubricant contained therein there is provided a closure or retaining cap 65. This retaining cap is preferably a sheet metal stamping in the form of a cone provided at its larger diameter end with an outwardly substantially radially extending flange 66, and at its smaller diameter end with a projecting cylindrical extension 67 of a diameter greater than the smaller diameter end of the cone as clearly shown in Figs. 1 and 3.

The retaining cap 65 is disposed in surrounding relation to the ball stem 52 and is fastened to the retaining ring 18 of the housing 1 by means of circumferentially arranged screw bolts 68, there being interposed between the retaining ring 18 and flange 66 a gasket 69 to insure a fluid tight seal at this point. As will be noted the retaining cap 65 projects inwardly of the housing 1 and ball 40, the cylindrical extension 67 being thus disposed in concentric relation to the spherical portion 62 on the ball stem 52, the space therebetween defining a packing chamber 70.

Positioned within the packing chamber 70 is a packing ring 74 of any suitable non-metallic material, and adapted to seat against the bottom transverse wall 75 of the retaining cap 65 joining the cylindrical portion 67 with the smaller diameter end of the cone shaped cap 65. Referring to Fig. 3 it will be noted that the smaller diameter end 76 of the cone shaped retainer cap 65 is substantially equal to or slightly greater than the diameter of the spherical portion 62 and spaced outwardly of the vertical diametral plane thereof. As a result of this relationship the width of the annular packing housing decreases towards the smaller diameter end 76. Placed against the packing ring 74 is a metallic washer 77 adapted to be engaged by the spring fingers 78 of the resilient thrust washer 80, of the type utilized in the packing described in the above identified patent. The resilient thrust washer 80 in turn abuts against the split ring collar 82 fitted within the annular groove 83 formed in the cylindrical extension 67. It is thus apparent that the packing ring 74 is wedged into the smaller portion of the housing 70 into fluid tight engagement with the spherical portion 62, which engagement is automatically maintained at all times by virtue of the resilient thrust washer 80.

Angular movement of the ball 40 and ball stem 52 relative to the housing 1 will cause the spherical portion 62 to move in the packing 74 in the manner readily apparent, see Fig. 1, which packing will function at its maximum efficiency irrespective of the degree of angularity (within the limits of the universal joint). The entry of dirt and foreign matter into the universal joint is prevented not only by the packing 74, but also by the retaining cap 65, which due to the cone-shaped formation and under the action of centrifugal force will act to throw out any dirt or foreign matter that may have settled thereon.

Cooperating with the internally splined hub 57 is the splined end 85 of a propeller or drive shaft 86, the dimensions of the hub 57 and splined end 85 being such as to permit longitudinal movement of the splined end 85 in the hub 57 during operating movements of the shaft 86. To prevent the entry of dust, etc., and the escape of lubricant from within the splined hub 57, the open end thereof is provided with a dust cap 87 threaded thereon, there being disposed within said dust cap 87, a packing ring 88, washer 89, resilient thrust washer 90 and abutment washer 91 all substantially of the same character as the packing construction in the housing 70.

Arranged adjacent the exterior end of the bore or passage 53 in the ball stem 52 is an annular recess 95, the diameter of said recess being greater than the diameter of said passage. Disposed on each side of the annular recess 95 are cylindrical seats 96 and 97, adapted to be engaged by the piston head 98 of a plunger 100. The plunger 100 is threadedly mounted in the splined end 85 of the shaft 86 for movement therewith and so adjusted relative thereto that the piston head 98 will seat on the seat 97 when the shaft 86 is in its outermost position, as clearly shown in Fig. 1.

In the operation of the universal joint, angular movement of the shaft 86 relative to the axis of the joint will cause the splined end 85 thereof to reciprocate in its splined connection with the hub 57. In the position of the parts shown in Fig. 1 it will be apparent that movement of the plunger 100 to the left will, when the piston head 98 registers with the recess 95, permit the lubricant to by-pass around the piston head 98 and into the hub 57, should the supply of lubricant therein be less than the required amount. Furthermore, this inward movement of the plunger 100 will prevent the building up of excess pressure within the joint housing due to the inward movement of the splined end 85 in the hub 57 in the event the hub 57 is filled with lubricant above the required amount in the space surrounding the plunger 100, by permitting an increase in the flow of the lubricant back into the housing as the piston head 98 moves into registry with the recess 95. In the event that movement of the plunger 100 becomes greater than normal, the piston head 98 will seat within the cylindrical seat portion 96 of the passage 53. Return movement of the piston head 98 from this position will permit lubricant to by-pass around the same through the recess 95 and into the hub 57. It is thus seen that the operation of the plunger 100 is at all times entirely automatic in its control of the supply of lubricant to the splined connections.

The lubricant is supplied to the interior of the housing through the passage 59 normally closed by the filler plug 60, and completely fills the interior of the ball and housing. Movement of the ball in the housing provides a pumping action, forcing lubricant from one side of the ball to the other. If desired in addition to the annular reservoir of lubricant 44 surrounding the ball, see Fig. 4, the interior surface of the housing may be provided with lubricant grooves 101, to facilitate the flow of lubricant. Rotation of the universal joint will cause the lubricant under the action of centrifugal force to tend to move radially away from the spherical portion 62 and packing 74, thus reducing to a minimum any tendency of the lubricant to leak past the packing.

Due to the placing of the packing 74 at the geometric center of the joint and the conical form of the retaining cap 65, the operating angle of the shaft 86 has been increased considerably beyond that normally obtained in universal joints of this type. Reference to Fig. 2 will show that the shaft 86 may operate at a maximum angle of 20° relative to the longitudinal axis of the joint.

While a preferred embodiment of my universal joint has been shown and described it is to be understood that changes may be made in the structure thereof within the scope of the appended claims.

I claim:—

1. A universal joint comprising a housing member, a hollow ball member of substantial uniform wall thickness throughout, a ball stem extending axially interiorly of said ball member and secured at one end to said ball member, said ball stem along the length thereof located within said ball member being spaced therefrom on each side of a diametrical plane thereof intersecting at right angles the axis of said ball stem.

2. A universal joint comprising a housing member, a hollow ball member, a ball stem rigidly secured to said ball member and projecting axially outwardly of said ball and housing members and defining with the interior of said ball member an annular chamber extending beyond each side of a diametrical plane at right angles to the axis of said ball stem.

3. A universal joint comprising a housing member, a hollow ball member, means carried by one of said members and operatively associated with the other of said members for torque transmission, a ball stem rigidly secured at one end to said ball member and projecting between said means outwardly of said ball and housing members, the axis of said ball stem being at right angles to the axis of said means, said ball stem and the interior of said ball member defining an annular chamber extending beyond each side of the axis of said means.

4. A universal joint comprising a housing member, a hollow ball member, means carried by one of said members and operatively associated with the other of said members for torque transmission, a ball stem rigidly secured at one end to the inner side of said ball member extending axially between said means and projecting outwardly of the interior of said ball and housing members, a spherical portion formed on said ball stem intermediate the ends thereof, said ball member and spherical portion having a common center.

5. A universal joint comprising a housing member, a hollow ball member, trunnions carried by one of said members and operatively associated with the other of said members for torque transmission, a ball stem rigidly secured at one end to the inner side of said ball member extending axially between said trunnions and projecting outwardly of the interior of said ball and housing members, a spherical portion formed on said ball stem intermediate the ends thereof, said trunnions, ball member and spherical portion having a common axis.

6. A universal joint comprising a housing member having an inner spherical surface, a ball member within said housing member and oscillatably connected thereto for torque transmission, said ball member being in the form of a segment of a sphere and so disposed within the housing member as to seat on said inner spherical surface substantially to one side of a diametral plane thereof, a ball stem rigid with said ball member and defining therewith an annular chamber.

7. In a universal joint, a hollow ball member formed in the shape of a segment of a sphere having ends of unequal diameters, trunnion bosses having a common axis arranged adjacent the larger end of said ball member, a ball stem boss arranged at the smaller end thereof, the common axis of said trunnion bosses and the axis of said ball stem boss being on diameters of said ball in planes disposed at right angles to each other.

8. In a universal joint, a hollow ball member formed in the shape of a segment of a sphere having ends of unequal diameters, diametrically spaced inwardly directed trunnion bosses integral with said ball member, arranged adjacent the larger end thereof and having a common axis, and an inwardly directed ball stem boss integral with said ball member at the smaller end thereof, the axis of said trunnion bosses and ball stem boss being on diameters of said ball member in planes at right angles to each other.

9. In a universal joint, a housing member, a hollow ball member seated therein, trunnion means on one member and operatively associated with the other member for torque transmission, a ball stem within said ball member rigidly secured at one end to one end thereof, and projecting outwardly from said ball and housing members, a retainer cap secured to said housing member and projecting into the interior of said ball member, and packing means carried by said retainer cap for engagement with an intermediate portion of said ball stem interiorly of said ball member for affecting a lubricant tight seal.

10. In a universal joint, a housing member open at one end, a hollow ball member seated therein, trunnion means on one member and operatively associated with the other member for torque transmission, a ball stem within said ball member rigidly secured at one end to one side thereof, and projecting outwardly of said ball and housing members, said ball stem being provided with a spherical portion intermediate the ends thereof, a retainer cap peripherally secured to the open end of said housing member and projecting into the interior of said ball member, packing means carried by said retainer cap in engagement with the spherical portion of the ball stem for affecting a lubricant tight seal.

11. In a universal joint as specified in claim 10, said spherical portion on the ball stem and said ball member having a common center.

12. In a universal joint as specified in claim 10, said retainer cap being substantially cone shaped and formed at its inner end with a cylindrical extension concentric with said spherical portion on the ball stem and defining therewith a packing chamber adapted to receive said packing means.

13. In a universal joint, a housing member open at one end, a hollow ball member seated therein and operatively associated therewith for torque transmission, a ball stem within said ball member rigidly secured at one end thereto and projecting outwardly of said ball and housing members, a spherical portion on said ball stem intermediate the ends thereof and so disposed as to have the same center as said ball member, a cone-shaped retainer cap peripherally secured at one end to the open end of said housing member and provided at its inner end with a cylindrical extension surrounding and in spaced relation to said spherical portion, a packing ring seated in said cylindrical extension and engaging said spherical portion, and spring means carried by said cylindrical portion for resiliently urging the packing ring into fluid tight engagement with said spherical portion.

14. In a universal joint, a housing member open at one end, a hollow ball member seated therein and operatively associated therewith for torque transmission, a ball stem within said ball member rigid therewith and projecting axially outwardly therefrom, a substantially cone-shaped lubricant retainer cap peripherally secured at one end to the open end of said housing member and projecting inwardly into said ball member and provided at its inner end with a cylindrical extension, spring pressed packing means disposed within said cylindrical extension in engagement with an intermediate portion of said ball stem for affecting a lubricant tight seal therewith irrespective of the angular relation of the ball stem axis to said housing member axis.

15. In a universal joint as specified in claim 14, said packing means and intermediate portion of said ball stem being arranged substantially at the center of said ball member.

16. In a universal joint, a two part housing member axially separable and open at one end, diametrically opposed channels formed in said housing member, U-shaped bearing shoes seated in said channels and engaging the walls thereof, a hollow ball member seated in said housing member, trunnions rigid with said ball member and extending within said channels, bearings mounted on said trunnions for rolling contact on said bearing shoes, a lubricant retaining cap secured to the open end of said housing, packing means carried by said retaining cap and positioned within said ball member and means cooperating with said ball member adapted for coaction with said packing means for affecting a lubricant tight seal against the leakage of lubricant out of said housing member.

17. In a universal joint, a lubricant seal for cooperating inner and outer joint members, comprising a spherical means carried by the inner member and a housing means carried by the outer member and encircling said spherical means in spaced relation to define a packing chamber, one end of said housing member converging towards said spherical means, packing arranged within said chamber, means exerting pressure on said packing to force the same into the converging portion of said housing member whereby said packing will be wedged into lubricant tight engagement with said spherical means.

18. The structure as specified in claim 17, said spherical means and said inner and outer joint members having a common center of oscillation.

19. In a universal joint, a lubricant seal between joint members having relative angular movement in all directions, one of said members being provided with a spherical portion and the other of said members with a housing portion encircling the same in spaced relation, one end of said housing portion having formed thereon an inclined shoulder directed towards said spherical portion, packing within said housing portion, means retaining said packing in said housing and cooperating with said inclined shoulder to wedge said packing against said spherical portion.

20. The structure as specified in claim 19, said means including automatic take up means reacting on said packing to continually urge the same against said inclined shoulder to compensate for wear on said packing.

21. In a universal joint comprising inner and outer joint members having a common center, a packing assembly carried by said outer joint member and disposed wholly within said inner joint member for cooperation with a part thereof.

22. The structure as specified in claim 21, said packing assembly being so disposed relative to the interior of said inner joint member as to be in communication therewith, said packing assembly being further arranged in concentric relation and in close proximity to said common center.

23. In a universal joint, cooperating joint elements, a lubricant retaining cap cone-shaped in form and provided at its larger diameter end with a radially extending attaching flange, supported by one of said joint elements a cylindrical extension provided at the smaller diameter end and of a diameter greater than the said smaller diameter end, a substantially inclined shoulder joining said cylindrical extension to the smaller diameter end of said cap and defining with said cylindrical extension a packing receiving chamber, a packing ring within said chamber and means also within said chamber adapted at all times to urge said packing ring into wedging engagement with said shoulder and with a cooperating spherical surface formed on the other joint element.

VILLOR P. WILLIAMS.